(12) United States Patent
Odajima et al.

(10) Patent No.: US 8,033,102 B2
(45) Date of Patent: Oct. 11, 2011

(54) EXHAUST EMISSION CONTROL DEVICE FOR INTERNAL COMBUSTION ENGINE, METHOD OF CONTROLLING THE EXHAUST EMISSION CONTROL DEVICE, AND ENGINE CONTROL UNIT

(75) Inventors: Akira Odajima, Saitama-ken (JP); Isao Kaneko, Saitama-ken (JP); Akio Yamanaka, Saitama-ken (JP); Toshiyuki Kabashima, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 259 days.

(21) Appl. No.: 12/241,684

(22) Filed: Sep. 30, 2008

(65) Prior Publication Data

US 2009/0084087 A1    Apr. 2, 2009

(30) Foreign Application Priority Data

Oct. 1, 2007    (JP) ................ 2007-257613

(51) Int. Cl.
*F01N 3/00*    (2006.01)

(52) U.S. Cl. ............. 60/286; 60/276; 60/285; 60/295; 60/297

(58) Field of Classification Search ............. 60/276, 60/277, 285, 286, 297, 301, 295
See application file for complete search history.

(56) References Cited

U.S. PATENT DOCUMENTS

| 5,483,795 A | 1/1996 | Katoh et al. | |
|---|---|---|---|
| 5,577,382 A * | 11/1996 | Kihara et al. | 60/276 |
| 5,713,199 A * | 2/1998 | Takeshima et al. | 60/276 |
| 5,715,679 A * | 2/1998 | Asanuma et al. | 60/276 |
| 5,735,119 A * | 4/1998 | Asanuma et al. | 60/276 |
| 5,740,669 A * | 4/1998 | Kinugasa et al. | 60/285 |
| 6,374,597 B1 * | 4/2002 | Bidner et al. | 60/285 |
| 6,679,050 B1 * | 1/2004 | Takahashi et al. | 60/285 |

FOREIGN PATENT DOCUMENTS

| JP | 2692380 | 9/1997 |
|---|---|---|
| JP | 11-165067 | 6/1999 |
| JP | 2003-056379 | 2/2003 |
| JP | 2004-270525 | 9/2004 |
| JP | 2005-002954 | 1/2005 |

\* cited by examiner

*Primary Examiner* — Tu Nguyen
(74) *Attorney, Agent, or Firm* — Nelson Mullins Riley & Scarborough LLP; Anthony A. Laurentano

(57) ABSTRACT

An exhaust emission control device for an internal combustion engine, which is capable of terminating reduction control in proper timing when a NOx cleaning catalyst includes an auxiliary catalyst having an oxygen storage capacity, thereby making it possible to reduce exhaust emissions and improve fuel economy. The exhaust emission control device includes the NOx cleaning catalyst and an ECU. The NOx cleaning catalyst includes the auxiliary catalyst having an oxygen storage capacity. The ECU executes reduction control when predetermined conditions for executing the reduction control are satisfied. During execution of the reduction control, when exhaust gas temperature is higher than a predetermined value, if a second excess air ratio is lower than a predetermined value, the ECU determines that the reduction control should be terminated. When the exhaust gas temperature is not higher than the predetermined value, if the remaining NOx amount is not larger than a predetermined value, the ECU determines that the reduction control should be terminated.

1 Claim, 6 Drawing Sheets

EXHAUST EMISSION CONTROL DEVICE FOR INTERNAL COMBUSTION ENGINE, METHOD OF CONTROLLING THE EXHAUST EMISSION CONTROL DEVICE, AND ENGINE CONTROL UNIT

BACKGROUND OF THE INVENTION

1. Field of the Invention

The present invention relates to an exhaust emission control device for an internal combustion engine that includes a NOx cleaning catalyst for reducing trapped NOx under a reducing atmosphere in an exhaust passage thereof, the exhaust emission control device supplying a reducing agent to an upstream side of the NOx cleaning catalyst, so as to cause the NOx cleaning catalyst to perform a NOx reducing operation, a method of controlling the exhaust emission control device, and an engine control unit.

2. Description of the Related Art

Conventionally, as an exhaust emission control device of this kind, one disclosed in the publication of Japanese Patent Publication No. 2692380 is known. The exhaust emission control device shown in FIG. 1 in this publication is applied to a gasoline engine. The gasoline engine has an exhaust passage provided with a NOx cleaning catalyst. The NOx cleaning catalyst traps NOx (nitrogen oxides) in exhaust gases under an oxidizing atmosphere, and reduces the trapped NOx when exhaust gases under a reducing atmosphere are supplied thereto, to thereby clean the exhaust gases, i.e. reduce exhaust emissions. Further, the exhaust emission control device is disposed in the exhaust passage at a location downstream of the NOx cleaning catalyst, and is provided with an air-fuel ratio sensor for detecting an air-fuel ratio of exhaust gases.

As shown in FIGS. 12 and 13 of the publication, in the exhaust emission control device, during a lean burn operation of the engine, an operation time period T of the lean burn operation is counted, and when the operation time period T exceeds a predetermined value To, reduction control is carried out so as to reduce NOx trapped in the NOx cleaning catalyst. More specifically, by switching the engine from the lean burn operation to a rich burn operation, exhaust gases under the reducing atmosphere, containing unburned fuel as a reducing agent, are supplied to the NOx cleaning catalyst. During the reduction control, when the air-fuel ratio detected by the air-fuel ratio sensor changes over from a lean air-fuel ratio to a rich air-fuel ratio, presumably, all the NOx trapped in the NOx cleaning catalyst has been reduced, and hence it is judged that the reduction control should be terminated, so that the reduction control is terminated to switch the engine from the rich burn operation to the lean burn operation.

Further, there has been recently proposed a technique of applying an auxiliary catalyst provided with an oxygen storage capacity to the NOx cleaning catalyst so as to increase the NOx purifying capability of the NOx cleaning catalyst. As an auxiliary catalyst of this kind is used a ceria-zirconia composite oxide disclosed e.g. in Japanese Laid-Open Patent Publication (Kokai) No. H11-165067. If such an auxiliary catalyst is used, when exhaust gases under the reducing atmosphere are supplied to the NOx cleaning catalyst, the auxiliary catalyst absorbs oxygen, whereby an operation for reducing NOx trapped in the NOx cleaning catalyst is accelerated, whereas when exhaust gases under the oxidizing atmosphere are supplied to the NOx cleaning catalyst, the auxiliary catalyst releases oxygen, whereby a NOx trapping operation of the NOx cleaning catalyst is accelerated.

To increase the NOx purifying capability of the NOx cleaning catalyst, if the auxiliary catalyst disclosed in Japanese Laid-Open Patent Publication (Kokai) No. H11-165067 is applied to the exhaust emission control device disclosed in the publication of Japanese Patent Publication No. 2692380, there can arise the following problems: In the case of the auxiliary catalyst disclosed in Japanese Laid-Open Patent Publication (Kokai) No. H11-165067, as shown in FIG. 3 in Japanese Laid-Open Patent Publication (Kokai) No. H11-165067, when the temperature of the auxiliary catalyst is within a predetermined temperature range (temperature range between 400 and 750° C.), the auxiliary catalyst has a very high oxygen storage capacity, whereas when the temperature of the auxiliary catalyst is not within the predetermined temperature range, the auxiliary catalyst has only a fairly low oxygen storage capacity. Therefore, during execution of the above-described reduction control, when the temperature of the NOx cleaning catalyst is not within the predetermined temperature range mentioned above, due to the fairly low oxygen storage capacity of the auxiliary catalyst, the reliability of the air-fuel ratio detected by the air-fuel ratio sensor is lowered, which make it impossible to terminate the reduction control in proper timing. As a result, when a time period over which the reduction control is executed is too short, the degree of reduction of NOx trapped in the NOx cleaning catalyst is lowered to degrade the NOx purifying capability of the NOx cleaning catalyst, resulting in an increase in exhaust emissions. On the other hand, when the time period over which the reduction control is executed is longer than required, fuel economy is degraded.

SUMMARY OF THE INVENTION

It is an object of the present invention to provide an exhaust emission control device for an internal combustion engine, a method of controlling the exhaust emission control device, and an engine control unit, which are capable of terminating reduction control in proper timing in a case where a NOx cleaning catalyst includes an auxiliary catalyst having an oxygen storage capacity, thereby making it possible to decrease exhaust emissions and improve fuel economy.

To attain the above object, in a first aspect of the present invention, there is provided an exhaust emission control device for an internal combustion engine, comprising a NOx cleaning catalyst disposed in an exhaust passage of the engine, the NOx cleaning catalyst including an auxiliary catalyst having an oxygen storage capacity, and operating to trap NOx contained in exhaust gases under an oxidizing atmosphere, and reduce the trapped NOx by being supplied with exhaust gases under a reducing atmosphere including a reducing agent, to thereby clean the NOx, oxygen storage capacity parameter-detecting means for detecting an oxygen storage capacity parameter indicative of the oxygen storage capacity of the auxiliary catalyst of the NOx cleaning catalyst, air-fuel ratio parameter-detecting means for detecting an air-fuel ratio parameter indicative of an air-fuel ratio of exhaust gases flowing through a portion of the exhaust passage downstream of the NOx cleaning catalyst, and reduction control means for executing reduction control in which exhaust gases flowing into the NOx cleaning catalyst are controlled to the reducing atmosphere, by supplying the reducing agent to an upstream side of the NOx cleaning catalyst, so as to cause the NOx cleaning catalyst to perform a NOx reducing operation, when predetermined conditions for executing the reduction control are satisfied, wherein the reduction control means comprises first determination means for determining that the reduction control should be terminated, when a first predetermined termination condition of the air-fuel ratio in the exhaust gases, indicated by the detected air-fuel ratio parameter, having been shifted to a richer value than a predetermined value during execution of the reduction control is satisfied, and inhibiting means for inhibiting the first determination means from determining termination of the reduction control during execution of the reduction control, when the oxygen storage capacity of the auxiliary catalyst, indicated by the detected oxygen storage capacity parameter, is not in a predetermined state.

With the configuration of the exhaust emission control device according to the first aspect of the present invention, to cause the NOx cleaning catalyst to perform the NOx reducing operation when the predetermined conditions for executing the reduction control are satisfied, the reducing agent is supplied to the upstream side of the NOx cleaning catalyst, whereby the reduction control in which exhaust gases flowing into the NOx cleaning catalyst are controlled to the reducing atmosphere is executed. During execution of the reduction control, when the air-fuel ratio in the exhaust gases, indicated by the detected air-fuel ratio parameter, has shifted to a richer value than the predetermined value, the first determination means determines that the reduction control should be terminated, and when the oxygen storage capacity of the auxiliary catalyst, indicated by the detected oxygen storage capacity parameter, is not in the predetermined state, the first determination means is inhibited from determining termination of the reduction control. Therefore, if the predetermined state is set to a state in which the auxiliary catalyst has a very high oxygen storage capacity, when the oxygen storage capacity of the auxiliary catalyst is in the predetermined state, it is possible to ensure high reliability of the detection by the air-fuel ratio parameter-detecting means. This makes it possible to ensure high reliability of the determination by the first determination means, whereby it is possible to terminate the reduction control in proper timing. On the other hand, when the determination by the first determination means is low in reliability because of the oxygen storage capacity of the auxiliary catalyst being not in the predetermined state, the first determination means is inhibited from determining the termination of the reduction control, so that it is possible to prevent the reduction control from being terminated in improper timing (It should be noted that throughout the specification "detection of the oxygen storage capacity parameter" includes not only directly detecting the oxygen storage capacity parameter e.g. by a sensor but also calculating the oxygen storage capacity parameter based on other parameters).

Preferably, the oxygen storage capacity parameter-detecting means detects a temperature parameter indicative of a temperature of the NOx cleaning catalyst as the oxygen storage capacity parameter, and the inhibiting means inhibits the first determination means from determining termination of the reduction control during execution of the reduction control, when the temperature of the NOx cleaning catalyst, indicated by the detected temperature parameter, is not within a predetermined temperature range.

With the configuration of the preferred embodiment, the temperature parameter indicative of the temperature of the NOx cleaning catalyst is detected as the oxygen storage capacity parameter, and during execution of the reduction control, the first determination means is inhibited from determining the termination of the reduction control, when the temperature of the NOx cleaning catalyst, indicated by the detected temperature parameter, is not within the predetermined temperature range. In this case, as described above, the auxiliary catalyst has a very high oxygen storage capacity when the temperature thereof is within the predetermined temperature range, whereas when the temperature of the auxiliary catalyst is not within the predetermined temperature range, the auxiliary catalyst has only a fairly low oxygen storage capacity. Therefore, if the predetermined temperature range is set to a temperature range in which the auxiliary catalyst has a very high oxygen storage capacity, it is possible to positively obtain the above-described advantageous effects provided by the exhaust emission control device.

Preferably, the reduction control means further comprises second determination means for determining that the reduction control should be terminated during execution of the reduction control, when the first determination means is inhibited from determining termination of the reduction control by the inhibiting means, if a second predetermined termination condition different from the first predetermined termination condition based on which the first determination means determines the termination of the reduction control is satisfied.

With the configuration of the preferred embodiment, when the first determination means is inhibited from determining termination of the reduction control by the inhibiting means, that is, when the determination by the first determination means is low in reliability since the oxygen storage capacity of the auxiliary catalyst is not in the predetermined state, if a predetermined termination condition different from the first predetermined termination condition based on which the first determination means determines the termination of the reduction control is satisfied, the second determination means determines that the reduction control should be terminated. Therefore, it is possible to properly determine timing for terminating the reduction control either by the first determination means or by the second determination means, irrespective of whether the auxiliary catalyst has a high or low oxygen storage capacity. As a consequence, it is possible to execute the reduction control for a just enough time period to thereby reduce exhaust emissions and improve fuel economy.

More preferably, the reduction control means further comprises remaining NOx amount-calculating means for calculating a remaining amount of NOx trapped in the NOx cleaning catalyst as a remaining NOx amount, during execution of the reduction control, based on a supply amount parameter indicative of a supply amount of the reducing agent, and the second determination means determines that the reduction control should be terminated when the first determination means is inhibited from determining termination of the reduction control by the inhibiting means, if the remaining amount of NOx is not larger than a predetermined value.

With the configuration of the preferred embodiment, during execution of the reduction control, the remaining amount of NOx trapped in the NOx cleaning catalyst is calculated as the remaining NOx amount based on the supply amount parameter indicative of the supply amount of the reducing agent, and the second determination means determines that the reduction control should be terminated when the first determination means is inhibited from determining termination of the reduction control by the inhibiting means, if the remaining amount of NOx is not larger than the predetermined value. In this case, the supply amount of the reducing agent properly represents the reduced amount of NOx trapped in the NOx cleaning catalyst during execution of the reduction control, and hence it is possible to accurately calculate the remaining amount of the NOx based on the supply amount parameter indicative of the supply amount of the reducing agent. This makes it possible to ensure high reliability of the determination by the second determination means for determining termination of the reduction control.

To attain the above object, in a second aspect of the present invention, there is a method of controlling an exhaust emission control device for an internal combustion engine, including a NOx cleaning catalyst disposed in an exhaust passage of the engine, the NOx cleaning catalyst including an auxiliary catalyst having an oxygen storage capacity, and operating to trap NOx contained in exhaust gases under an oxidizing atmosphere, and reduce the trapped NOx by being supplied with exhaust gases under a reducing atmosphere including a reducing agent, to thereby clean the NOx, the method comprising an oxygen storage capacity parameter-detecting step of detecting an oxygen storage capacity parameter indicative of the oxygen storage capacity of the auxiliary catalyst of the NOx cleaning catalyst, an air-fuel ratio parameter-detecting step of detecting an air-fuel ratio parameter indicative of an air-fuel ratio of exhaust gases flowing through a portion of the exhaust passage downstream of the NOx cleaning catalyst, and a reduction control step of executing reduction control in which exhaust gases flowing into the NOx cleaning catalyst are controlled to the reducing atmosphere, by supplying the reducing agent to an upstream side of the NOx cleaning catalyst, so as to cause the NOx cleaning catalyst to perform a NOx reducing operation, when predetermined conditions for executing the reduction control are satisfied, and the reduction control step comprises a first determination step of determining that the reduction control should be terminated, when a first predetermined termination condition of the air-fuel ratio in the exhaust gases, indicated by the detected air-fuel ratio parameter, having been shifted to a richer value than a predetermined value during execution of the reduction control is satisfied, and an inhibiting step of inhibiting termination of the reduction control from being inhibited in the first determination step during execution of the reduction control, when the oxygen storage capacity of the auxiliary catalyst, indicated by the detected oxygen storage capacity parameter, is not in a predetermined state.

With the configuration of the method according to the second aspect of the present invention, it is possible to obtain the same advantageous effects as provided by the first aspect of the present invention.

Preferably, the oxygen storage capacity parameter-detecting step includes detecting a temperature parameter indicative of a temperature of the NOx cleaning catalyst as the oxygen storage capacity parameter, and the inhibiting step includes inhibiting termination of the reduction control from being determined in the first determination step during execution of the reduction control, when the temperature of the NOx cleaning catalyst, indicated by the detected temperature parameter, is not within a predetermined temperature range.

Preferably, the reduction control step further comprises a second determination step of determining that the reduction control should be terminated during execution of the reduction control, when determination of termination of the reduction control in the first determination step is inhibited in the inhibiting step, if there is satisfied a second predetermined termination condition different from the first predetermined termination condition based on which the termination of the reduction control is determined in the first determination step.

More preferably, the reduction control step further comprises a remaining NOx amount-calculating step of calculating a remaining amount of NOx trapped in the NOx cleaning catalyst as a remaining NOx amount, during execution of the reduction control, based on a supply amount parameter indicative of a supply amount of the reducing agent, and the second determination step includes determining that the reduction control should be terminated when determination of termination of the reduction control in the first determination step is inhibited in the inhibiting step, if the remaining amount of NOx is not larger than a predetermined value.

With the configurations of these preferred embodiments, it is possible to obtain the same advantageous effects as provided by the respective corresponding preferred embodiments of the first aspect of the present invention.

To attain the above object, in a third aspect of the present invention, there is provided an engine control unit including a control program for causing a computer to execute a method of controlling an exhaust emission control device for an internal combustion engine, including a NOx cleaning catalyst disposed in an exhaust passage of the engine, the NOx cleaning catalyst including an auxiliary catalyst having an oxygen storage capacity, and operating to trap NOx contained in exhaust gases under an oxidizing atmosphere, and reduce the trapped NOx by being supplied with exhaust gases under a reducing atmosphere including a reducing agent, to thereby clean the NOx, wherein the method comprises an oxygen storage capacity parameter-detecting step of detecting an oxygen storage capacity parameter indicative of the oxygen storage capacity of the auxiliary catalyst of the NOx cleaning catalyst, an air-fuel ratio parameter-detecting step of detecting an air-fuel ratio parameter indicative of an air-fuel ratio of exhaust gases flowing through a portion of the exhaust passage downstream of the NOx cleaning catalyst, and a reduction control step of executing reduction control in which exhaust gases flowing into the NOx cleaning catalyst are controlled to the reducing atmosphere, by supplying the reducing agent to an upstream side of the NOx cleaning catalyst, so as to cause the NOx cleaning catalyst to perform a NOx reducing operation, when predetermined conditions for executing the reduction control are satisfied, wherein the reduction control step comprises a first determination step of determining that the reduction control should be terminated, when a first predetermined termination condition of the air-fuel ratio in the exhaust gases, indicated by the detected air-fuel ratio parameter, having been shifted to a richer value than a predetermined value during execution of the reduction control is satisfied, and an inhibiting step of inhibiting termination of the reduction control from being inhibited in the first determination step during execution of the reduction control, when the oxygen storage capacity of the auxiliary catalyst, indicated by the detected oxygen storage capacity parameter, is not in a predetermined state.

With the configuration of the engine control unit according to the third aspect of the present invention, it is possible to obtain the same advantageous effects as provided by the first aspect of the present invention.

Preferably, the oxygen storage capacity parameter-detecting step includes detecting a temperature parameter indicative of a temperature of the NOx cleaning catalyst as the oxygen storage capacity parameter, and the inhibiting step includes inhibiting termination of the reduction control from being determined in the first determination step during execution of the reduction control, when the temperature of the NOx cleaning catalyst, indicated by the detected temperature parameter, is not within a predetermined temperature range.

Preferably, the reduction control step further comprises a second determination step of determining that the reduction control should be terminated during execution of the reduction control, when determination of termination of the reduction control in the first determination step is inhibited in the inhibiting step, if there is satisfied a second predetermined termination condition different from the first predetermined termination condition based on which the termination of the reduction control is determined in the first determination step.

More preferably, the reduction control step further comprises a remaining NOx amount-calculating step of calculating a remaining amount of NOx trapped in the NOx cleaning catalyst as a remaining NOx amount, during execution of the reduction control, based on a supply amount parameter indicative of a supply amount of the reducing agent, and the second determination step includes determining that the reduction control should be terminated when determination of termination of the reduction control in the first determination step is inhibited in the inhibiting step, if the remaining amount of NOx is not larger than a predetermined value.

With the configurations of these preferred embodiments, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

Figure 1:
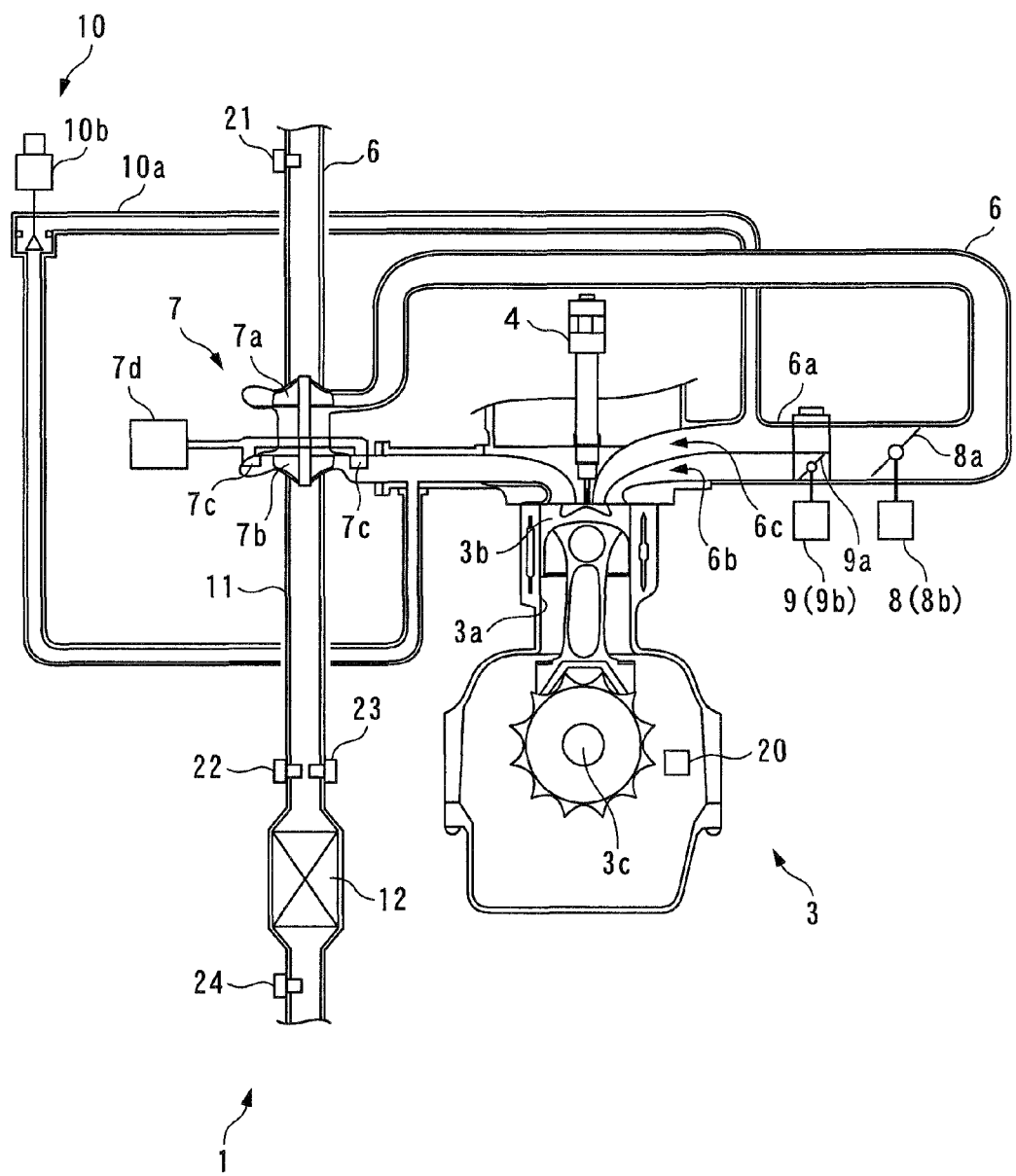
FIG. 1 is a schematic diagram of an exhaust emission control device according to an embodiment of the present invention, and an internal combustion engine to which is applied the exhaust emission control device.
Figure 2:
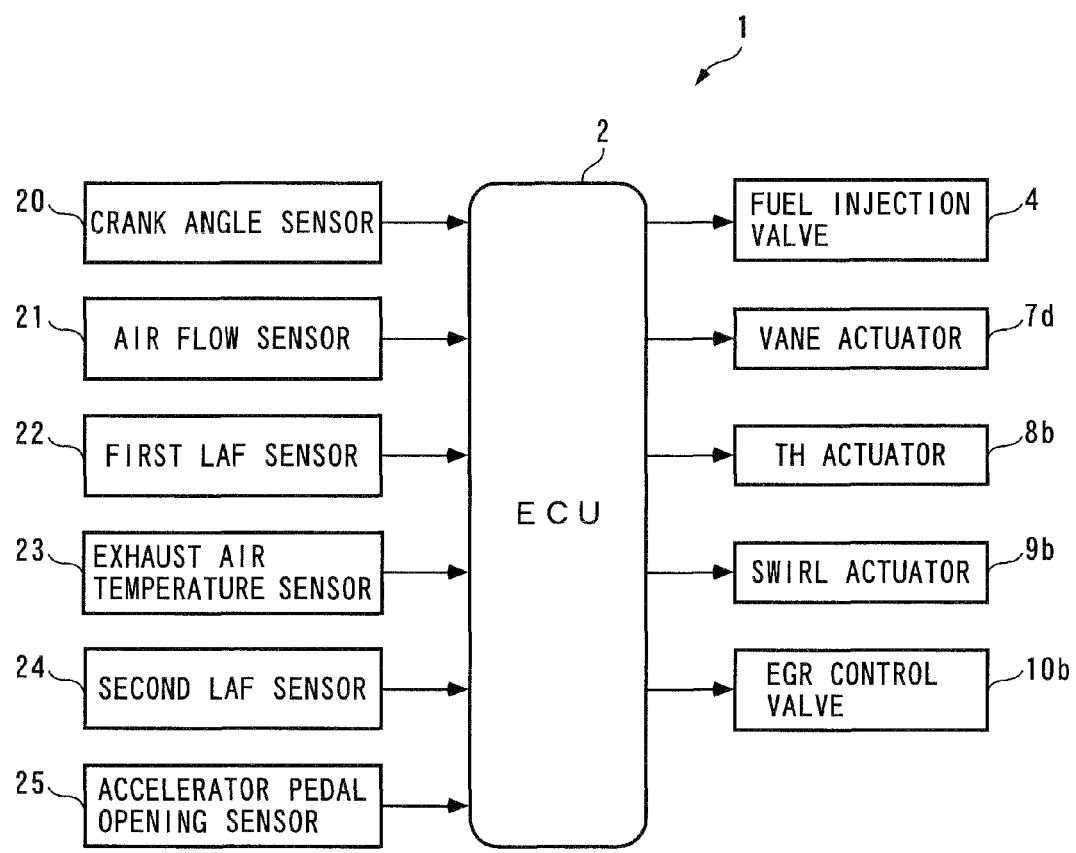
FIG. 2 is a schematic block diagram of the exhaust emission control device.

Hereafter, an exhaust emission control device for an internal combustion engine, according to an embodiment of the present invention will be described with reference to the drawings. FIG. 1 schematically shows the exhaust emission control device 1 according to the present embodiment, and the internal combustion engine (hereinafter referred to as "the engine") 3 to which is applied the exhaust emission control device 1. As shown in FIG. 2, the exhaust emission control device 1 includes an ECU 2. As described hereinafter, the ECU 2 carries out various control processes, such as an air-fuel ratio control process including a reduction control process, depending on operating conditions of the engine 3.

The engine 3 is an in-line four-cylinder diesel engine installed on a vehicle, not shown, and includes four pairs of cylinders 3a and pistons 3b (only one pair of which is shown), a crankshaft 3c, and so forth. The engine 3 is provided with a crank angle sensor 20. The crank angle sensor 20 is comprised of a magnet rotor and an MRE (magnetic resistance element) pickup, and delivers a CRK signal and a TDC signal, which are both pulse signals, to the ECU 2 in accordance with rotation of the crankshaft 3c.

Each pulse of the CRK signal is delivered whenever the crankshaft 3c rotates through a predetermined angle (e.g. 30°). The ECU 2 calculates the rotational speed NE of the engine 3 (hereinafter referred to as "the engine speed NE") based on the CRK signal. The TDC signal indicates that each piston 3b in the associated cylinder 3a is in a predetermined crank angle position slightly before the TDC position at the start of the intake stroke, and each pulse thereof is delivered whenever the crankshaft 3c rotates through a predetermined crank angle.

Further, the engine 3 includes fuel injection valves 4 (only one of which is shown) provided for the respective cylinders 3a. The fuel injection valves 4 are all electrically connected to the ECU 2. As described hereinafter, the valve-opening time period and the valve-opening timing of each fuel injection valve 4 are controlled by the ECU 2, whereby a fuel injection amount and fuel injection timing of fuel injected from the fuel injection valve 4 are controlled.

An air flow sensor 21, a turbocharger 7, a throttle valve mechanism 8, and a swirl valve mechanism 9 are provided at respective locations of an intake passage 6 of the engine 3 from upstream to downstream in the mentioned order. The air flow sensor 21 is formed by a hot-wire air flow meter, and detects the flow rate of fresh air flowing through a throttle valve 8a, described hereinafter, and delivers a signal indicative of the detected fresh air flow rate to the ECU 2. The ECU 2 calculates the amount M_ACT of fresh air, estimated to have been actually drawn into each cylinder 3a, based on the signal from the air flow sensor 21.

Further, the turbocharger 7 is comprised of a compressor blade 7a disposed in the intake passage 6 at a location downstream of the air flow sensor 21, a turbine blade 7b disposed in an intermediate portion of an exhaust passage 11, for rotating in unison with the compressor blade 7a, a plurality of variable vanes 7c (only two of which are shown), and a vane actuator 7d for actuating the variable vanes 7c.

In the turbocharger 7, as the turbine blade 7b is driven for rotation by exhaust gases flowing through the exhaust passage 11, the compressor blade 7a integrally formed with the turbine blade 7b rotates simultaneously with the rotation of the turbine blade 7b, whereby fresh air within the intake passage 6 is pressurized. In short, supercharging is carried out.

Further, the variable vanes 7c change boost pressure generated by the turbocharger 7, and are pivotally mounted on a wall of a turbine blade-accommodating portion of a housing. The variable vanes 7c are mechanically connected to the vane actuator 7d connected to the ECU 2. The ECU 2 changes the degree of opening of the variable vanes 7c via the vane actuator 7d to change the amount of exhaust gases blown to the turbine blade 7b, whereby the rotational speed of the turbine blade 7b, that is, the rotational speed of the compressor blade 7a, is changed to thereby control the boost pressure.

On the other hand, the throttle valve mechanism 8 includes a throttle valve 8a and a TH actuator 8b for actuating the throttle valve 8a. The throttle valve 8a is pivotally disposed in an intermediate portion of the intake passage 6 such that the degree of opening thereof is changed by the pivotal motion thereof to thereby change the flow rate of fresh air flowing through the throttle valve 8a. The TH actuator 8b is formed by combining a motor, not shown, and a reduction gear mechanism, not shown, and is electrically connected to the ECU 2. The ECU 2 controls the degree of opening of the throttle valve 8a via the TH actuator 8b.

Further, a portion of the intake passage 6 downstream of the throttle valve mechanism 8 forms an intake manifold 6a comprised of a collecting section and four branch portions branching therefrom. A passage within the intake manifold 6a is divided into a swirl passage 6b and a bypass passage 6c between the collecting section and each branch portion. The passages 6b and 6c communicate with an associated one of the cylinders 3a via two intake ports.

The above-described swirl valve mechanism 9 stirs a mixture in each cylinder 3a by generating a swirl in the cylinder 3a, and is comprised of a swirl valve 9a disposed in the swirl passage 6b, and a swirl actuator 9b for actuating the swirl valve 9a. The swirl actuator 9b is formed by combining a motor, not shown, and a reduction gear mechanism, not shown, and is electrically connected to the ECU 2. The ECU 2 changes the degree of opening of the swirl valve 9a via the swirl actuator 9b, to thereby control a generation of the swirl in the cylinder 3a.

Further, the engine 3 is provided with an exhaust gas recirculation system 10. The exhaust gas recirculation system 10 recirculates part of exhaust gases flowing through the exhaust passage 11 toward the intake passage 6, and is comprised of an EGR passage 10a connected between the intake passage 6 and the exhaust passage 11, and an EGR control valve 10b for opening and closing the EGR passage 10a. The EGR passage 10a has one end opening in a portion of the exhaust passage 11 upstream of the turbine blade 7b, and the other end opening in a portion of the bypass passage 6c of the intake passage 6.

The EGR control valve 10b is implemented by a linear solenoid valve a valve lift of which is linearly changed between a maximum value and a minimum value thereof, and is electrically connected to the ECU 2. The ECU 2 changes the degree of opening of the EGR passage 8a via the EGR control valve 10b to thereby control the amount of exhaust recirculation, i.e. the EGR amount.

Further, a NOx cleaning catalyst 12 is provided in the exhaust passage 11 at a location downstream of the turbine blade 7b. The NOx cleaning catalyst 12 is comprised of an alumina carrier, platinum and barium supported thereon as primary catalysts, and a ceria-zirconia composite oxide supported thereon as an auxiliary catalyst. The ceria-zirconia composite oxide has characteristics that it has a high oxygen storage capacity when it is within a predetermined temperature range (when TEX>TREF, referred to hereinafter, holds), whereas when it is out of the predetermined temperature range (when TEX≦TREF holds), it has only a fairly low oxygen storage capacity.

In the NOx cleaning catalyst 12, when exhaust gases under an oxidizing atmosphere, i.e. exhaust gases in which the concentration of oxygen is higher than the concentration of oxygen in exhaust gases corresponding to the stoichiometric air-fuel ratio flow into the NOx cleaning catalyst 12, NOx in the exhaust gases is trapped in the primary catalysts, and the oxygen is released from the auxiliary catalyst, whereby a NOx-trapping operation of the primary catalysts is accelerated. On the other hand, when exhaust gases under a reducing atmosphere flow into the NOx cleaning catalyst 12 e.g. by reduction control, described hereinafter, trapped NOx is reduced by catalytic actions of the primary catalysts, and oxygen is absorbed in the auxiliary catalyst, whereby a NOx-reducing operation of the primary catalysts is accelerated.

Further, a first LAF sensor 22 and an exhaust air temperature sensor 23 are provided in the exhaust passage 11 at respective locations upstream of and close to the NOx cleaning catalyst 12. The first LAF sensor 22 is comprised of a zirconia layer and platinum electrodes, and linearly detects the concentration of oxygen in exhaust gases flowing through the exhaust passage 11, in a broad air-fuel ratio range from a rich region richer than the stoichiometric air-fuel ratio to a very lean region, and delivers a signal indicative of the detected oxygen concentration to the ECU 2. The ECU 2 calculates the excess air ratio λ1 of exhaust gases flowing into the NOx cleaning catalyst 12 (hereinafter referred to as "the first excess air ratio λ1"), based on the signal from the first LAF sensor 22.

Further, the exhaust air temperature sensor 23 detects the temperature TEX of exhaust gases flowing into the NOx cleaning catalyst 12 (hereinafter referred to as "the exhaust air temperature TEX"), and delivers a signal indicative of the detected exhaust air temperature TEX to the ECU 2. The ECU 2 calculates the exhaust air temperature TEX based on the signal from the exhaust air temperature sensor 23. It should be noted that in the present embodiment, the exhaust air temperature sensor 23 corresponds to oxygen storage capacity parameter-detecting means, and the exhaust air temperature TEX corresponds to an oxygen storage capacity parameter and a temperature parameter.

Furthermore, a second LAF sensor 24 is provided in the exhaust passage 11 at a location downstream of and close to the NOx cleaning catalyst 12. The second LAF sensor 24 is configured similarly to the first LAF sensor 22, and linearly detects the concentration of oxygen in exhaust gases flowing through the exhaust passage 11, in a broad air-fuel ratio range from a rich region richer than the stoichiometric air-fuel ratio to a very lean region, to deliver a signal indicative of the detected oxygen concentration to the ECU 2. The ECU 2 calculates the excess air ratio λ2 of exhaust gases having flowed through the NOx cleaning catalyst 12 (hereinafter referred to as "the second excess air ratio λ2"), based on the signal from the second LAF sensor 24. It should be noted that in the present embodiment, the second LAF sensor 24 corresponds to air-fuel ratio parameter-detecting means, and the second excess air ratio λ2 corresponds to an air-fuel ratio parameter.

An accelerator pedal opening sensor 25 is connected to the ECU 2. The accelerator pedal opening sensor 25 detects a stepped-on amount AP of an accelerator pedal, not shown, of the vehicle (hereinafter referred to as "the accelerator pedal opening AP") and delivers a signal indicative of the detected accelerator pedal opening AP to the ECU 2.

The ECU 2 is implemented by a microcomputer comprised of a CPU, a RAM, a ROM and an I/O interface (none of which are specifically shown). The ECU 2 determines an operating condition of the engine 3 in response to the signals from the aforementioned sensors 20 to 25, and based on the determined operating condition of the engine, performs control processes including an air-fuel ratio control process, as described hereinafter. As a result, during normal operation of the engine 3, the excess air ratio λ of the mixture is controlled to a leaner value than the stoichiometric air-fuel ratio, and during reduction control, the excess air ratio λ is controlled to a predetermined reduction control value λ_RICH, referred to hereinafter, so as to reduce NOx trapped in the NOx cleaning catalyst 12.

Further, the ECU 2 includes a RAM provided with a backup power supply which can hold stored data even during stoppage of the engine after the ignition switch is turned off, and a general RAM without a backup power supply. Values, such as a trapped NOx amount S_QNOx, described hereinafter, are stored in the RAM provided with the backup power supply.

It should be noted that in the present embodiment, the ECU 2 corresponds to the oxygen storage capacity parameter-detecting means, the air-fuel ratio parameter-detecting means, reduction control means, first determination means, inhibiting means, second determination means, and remaining NOx amount-calculating means.

Figure 3:
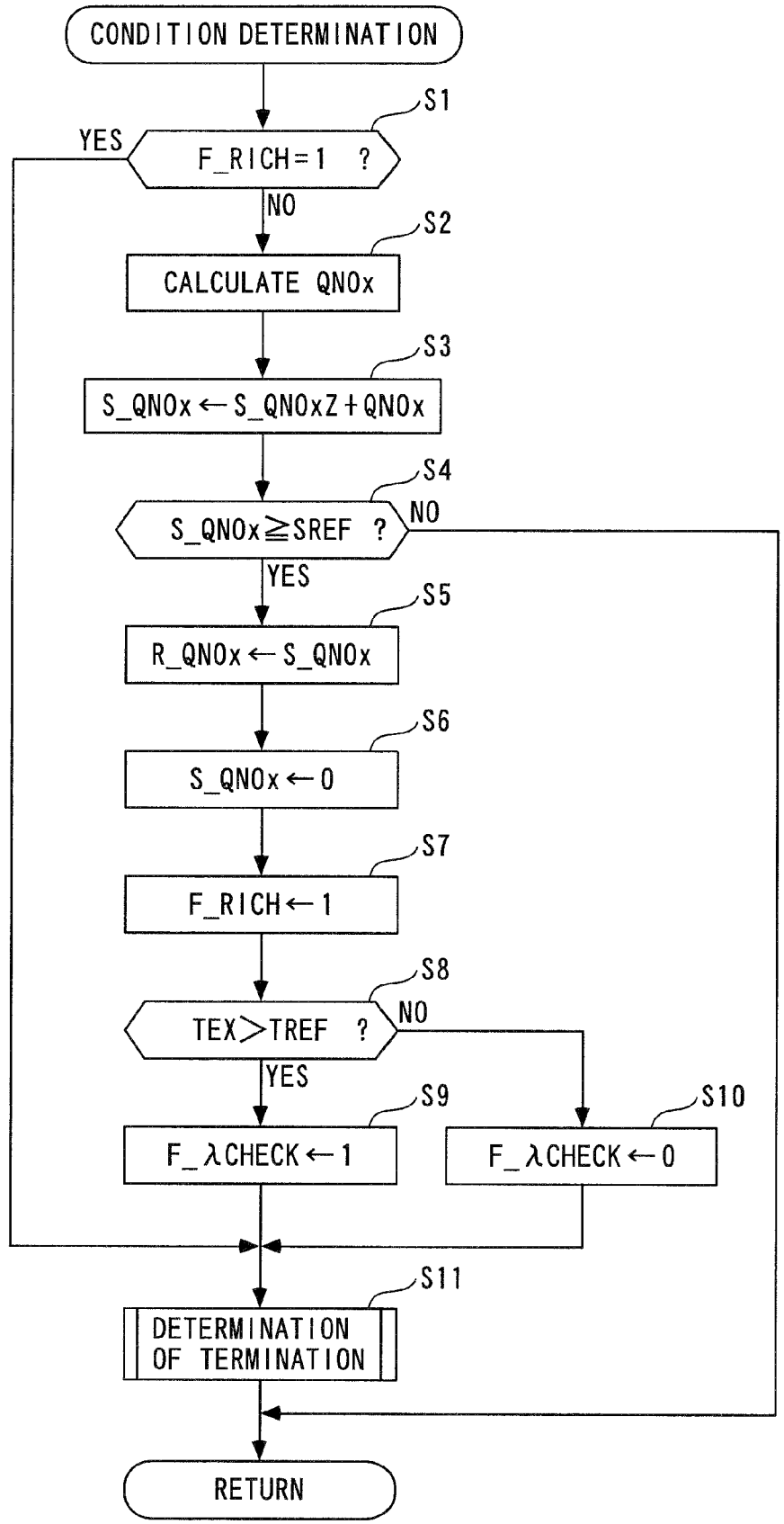
FIG. 3 is a flowchart showing a condition determining process.

Next, a condition determining process executed by the ECU 2 will be described with reference to FIG. 3. As described hereinafter, this process determines whether or not conditions for executing reduction control for reducing NOx trapped in the NOx cleaning catalyst 12 are satisfied, and determines whether or not conditions for terminating the reduction control are satisfied, after the conditions for executing the reduction control are satisfied. The condition determining process is executed at a predetermined control period (of e.g. 10 msec).

In the condition determining process, first, in a step 1 (shown as S1 in abbreviated form in FIG. 3; the following steps are also shown in abbreviated form), it is determined whether or not a reducing condition flag F_RICH is equal to 1. If the answer to this question is negative (NO), i.e. if F_RICH=0 holds, the process proceeds to a step 2, wherein an exhausted NOx amount QNOx is calculated by searching a map (not shown) according to a demanded torque PMCMD, referred to hereinafter, and the engine speed NE.

Next, the process proceeds to a step 3, wherein the trapped NOx amount S_QNOx is set to the sum of the immediately preceding value S_QNOxZ thereof and the exhausted NOx amount QNOx. The trapped NOx amount S_QNOx corresponds to an estimated value of the amount of NOx trapped in the NOx cleaning catalyst 12.

Then, the process proceeds to a step 4, wherein it is determined whether or not the trapped NOx amount S_QNOx is not smaller than a predetermined value SREF. If the answer to this question is negative (NO), it is judged that the conditions for executing the reduction control are not satisfied, and the present process is immediately terminated.

On the other hand, if the answer to the question of the step 4 is affirmative (YES), it is judged that the conditions for executing the reduction control are satisfied, and the process proceeds to a step 5, wherein a remaining NOx amount R_QNOx is set to the trapped NOx amount S_QNOx.

Next, in a step 6, the trapped NOx amount S_QNOx is reset to 0, and then the process proceeds to a step 7, wherein to indicate satisfaction of the conditions for executing the reduction control, the reducing condition flag F_RICH is set to 1. As described above, when the reducing condition flag F_RICH is set to 1 in the step 7, in the following loops, the answer to the question of the step 1 becomes affirmative (YES), and in this case, the process proceeds to a step 11, described hereinafter.

In a step 8 following the step 7, it is determined whether or not the exhaust air temperature TEX is higher than a predetermined value TREF. If the answer to this question is affirmative (YES), i.e. if the auxiliary catalyst of the NOx cleaning catalyst 12 is within the predetermined temperature range in which it has a high oxygen storage capacity, it is judged that the signal from the second LAF sensor 24 is in a state in which it has a high reliability, so that determination of termination of the reduction control should be executed based on the second excess air ratio $\lambda 2$, and to indicate the fact, the process proceeds to a step 9, wherein a lambda determination flag F_$\lambda$CHECK is set to 1. Then, the process proceeds to the step 11, described hereinafter.

On the other hand, if the answer to the question of the step 8 is negative (NO), i.e. if the auxiliary catalyst of the NOx cleaning catalyst 12 is within a temperature range in which it has only a fairly low oxygen storage capacity, it is judged that the signal from the second LAF sensor 24 is in a state in which it has a low reliability, and hence determination of termination of the reduction control should be executed based on the remaining NOx amount R_QNOx, and to indicate the fact, the process proceeds to a step 10, wherein the lambda determination flag F_$\lambda$CHECK is set to 0. After that, the process proceeds to the step 11, described hereinafter.

In the step 11 following any of the steps 1, 9, and 10, a termination determining process is executed, followed by terminating the present process, as described hereinafter.

Figure 4:
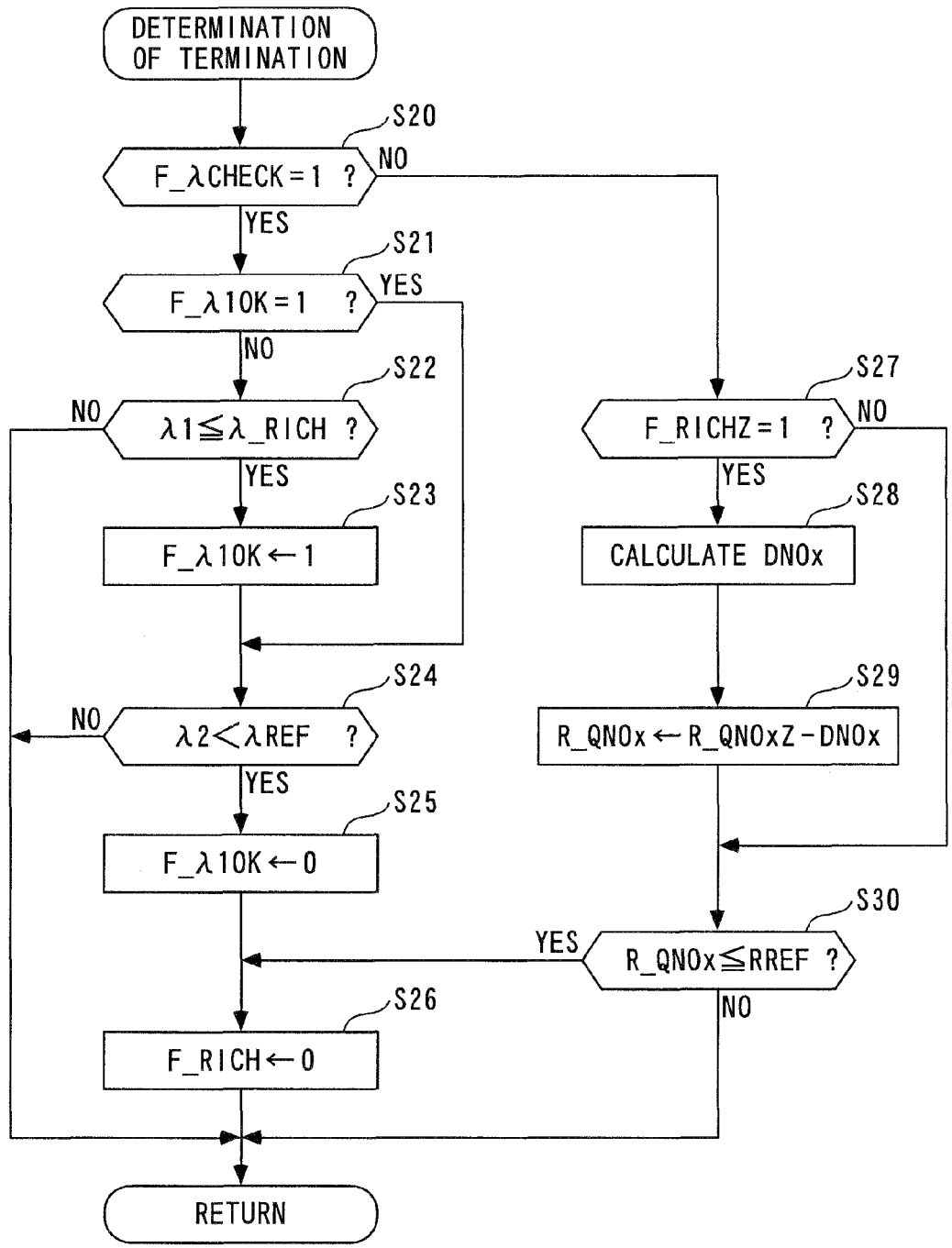
FIG. 4 is a flowchart showing a termination determining process.

Next, the termination determining process in the above-mentioned step 11 will be described with reference to FIG. 4.

In this process, first, in a step 20. it is determined whether or not the lambda determination flag F_$\lambda$CHECK is equal to 1. If the answer to this question is affirmative (YES), i.e. if the determination of termination of the reduction control should be executed based on the second excess air ratio $\lambda 2$, the process proceeds to a step 21, wherein it is determined whether or not a reducing atmosphere flag F_$\lambda$1OK is equal to 1.

If the answer to this question is negative (NO), the process proceeds to a step 22, wherein it is determined whether or not the first excess air ratio $\lambda 1$ is not larger than the predetermined reduction control value $\lambda$_RICH. If the answer to this question is negative (NO), i.e. if $\lambda 1 > \lambda$_RICH holds, the present process is immediately terminated.

On the other hand, if the answer to the question of the step 22 is affirmative (YES), i.e. if exhaust gases flowing into the NOx cleaning catalyst 12 form a sufficient reducing atmosphere in accordance with execution of the reduction control, the process proceeds to a step 23, and to indicate the fact, the reducing atmosphere flag F_$\lambda$1OK is set to 1. When the reducing atmosphere flag F_$\lambda$1OK is thus set to 1 in the step 23, in the following loops, the answer to the question of the step 21 becomes affirmative (YES), and in this case, the process proceeds to a step 24, referred to hereinafter.

In the step 24 following the step 21 or 23, it is determined whether or not the second excess air ratio $\lambda 2$ is smaller than a predetermined value $\lambda$REF. The predetermined value $\lambda$REF is set to a value which satisfies the relationship of $\lambda$_RICH<$\lambda$REF<1 and at the same time is close to 1. This is because when the second excess air ratio $\lambda 2$ becomes smaller than 1 during the reduction control, the amount of reducing agent passing through the NOx cleaning catalyst 12 increases to increase exhaust emissions. Therefore, the predetermined value $\lambda$REF is set as above to avoid the increase in the amount of reducing agent passing through the NOx cleaning catalyst 12 and the resulting degradation of exhaust emissions as much as possible.

If the answer to the question of the step 24 is negative (NO), i.e. if $\lambda 2 \geq \lambda$REF holds, it is judged that the reduction control should be continued, and the present process is immediately terminated. On the other hand, if the answer to the question of the step 24 is affirmative (YES), i.e. if $\lambda 2 < \lambda$REF holds, it is judged that the reduction of NOx trapped in the NOx cleaning catalyst 12 has been completed, and hence the reduction process should be terminated, so that the process proceeds to a step 25, wherein the reducing atmosphere flag F_$\lambda$1OK is set to 0.

Next, the process proceeds to a step 26, wherein to indicate that the reduction process should be terminated, the reducing condition flag F_RICH is reset to 0, followed by terminating the present process.

On the other hand, if the answer to the question of the step 20 is negative (NO), i.e. if the determination of termination of the reduction control should be executed based on the remaining NOx amount R_QNOx, the process proceeds to a step 27, wherein it is determined whether or not the immediately preceding value F_RICHZ of the reducing condition flag is equal to 1. If the answer to this question is negative (NO), i.e. if the conditions for executing the reduction control were not satisfied in the immediately preceding control timing, but they are satisfied in the current control timing, the process proceeds to a step 30, described hereinafter.

On the other hand, if the answer to the question of the step 27 is affirmative (YES), i.e. if the conditions for executing the reduction control were satisfied in the immediately preceding control timing, the process proceeds to a step 28, wherein a reduced NOx amount DNOx is calculated. The reduced NOx amount DNOx represents the amount of NOx which is estimated to have been reduced by the reduction control over a time period between the immediately preceding control timing and the current control timing. More specifically, the reduced NOx amount DNOx is calculated by searching a map (not shown) according to a fresh air amount M_ACT, the engine sped NE, and a fuel injection amount QINJ, referred to hereinafter. It should be noted that in the present embodiment, the fresh air amount M_ACT, the engine sped NE, and the fuel injection amount QINJ correspond to supply amount parameters.

Then, the process proceeds to a step 29, wherein the remaining NOx amount R_QNOx is set to a value obtained by subtracting the reduced NOx amount DNOx from the immediately preceding value R_QNOxZ of the remaining NOx amount.

In a step 30 following the step 27 or 29, it is determined whether or not the remaining NOx amount R_QNOx is not larger than a predetermined value RREF. If the answer to this question is negative (NO), the present process is immediately terminated. On the other hand, if the answer to the question of the step 30 is affirmative (YES), it is judged that the reduction of NOx trapped in the NOx cleaning catalyst 12 has been completed, and hence the reduction process should be terminated, so that, as mentioned hereinbefore, in the step 26, the reducing condition flag F_RICH is reset to 0, followed by terminating the present process.

Figure 5:
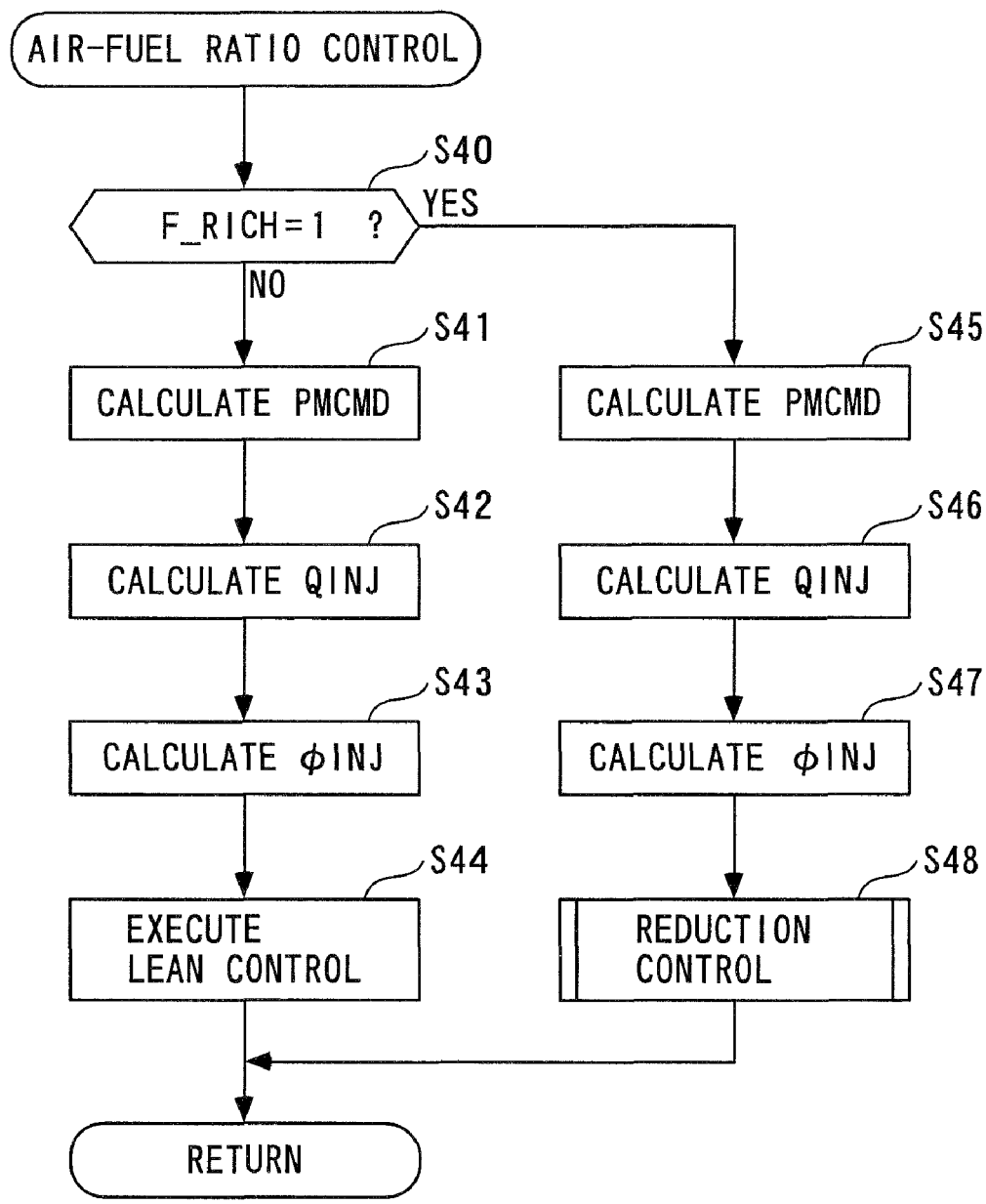
FIG. 5 is a flowchart showing an air-fuel ratio control process.

Next, the air-fuel ratio control process executed by the ECU 2 will be described with reference to FIG. 5. As will be described hereinafter, this process controls the air-fuel ratio of a mixture to be supplied to each cylinder 3a, and is executed at a predetermined control period (synchronous with generation of each TDC signal pulse).

In this process, first, in a step 40, it is determined whether or not the above-mentioned reducing condition flag F_RICH is equal to 1. If the answer to this question is negative (NO), i.e. if the conditions for executing the reduction control are not satisfied, it is judged that the air-fuel ratio should be controlled to be lean, and the process proceeds to a step 41, wherein the demanded torque PMCMD is calculated by searching a map (not shown) for lean control according to the engine speed NE and the accelerator pedal opening AP.

In a step 42 following the step 41, the fuel injection amount QINJ is calculated by searching a map (not shown) for lean control according to the engine speed NE and the demanded torque PMCMD.

Next, the process proceeds to a step 43, wherein fuel injection termination timing φINJ is calculated by searching a map (not shown) for lean control according to the engine speed NE and the fuel injection amount QINJ, whereby according to the fuel injection amount QINJ and the fuel injection termination timing φINJ, calculated as above, fuel is injected sequentially from the fuel injection valves 4 into the respective cylinders 3a associated therewith.

In a step 44 following the step 43, a lean control process is carried out. More specifically, as described hereinafter, a throttle valve control process, a boost pressure control process, a swirl control process, and an EGR control process are performed.

First, in the throttle valve control process, a target throttle valve opening TH_CMD is set to a predetermined WOT (Wide-Open Throttle) value TH_WOT, and a control input corresponding to the target throttle valve opening TH_CMD is supplied to the TH actuator 8b, whereby the throttle valve 8a is controlled to a wide-open (fully-open) state.

Further, in the boost pressure control process, a target vane opening VANE_CMD of the variable vanes 7c is calculated by searching a map (not shown) for lean control according to the fuel injection amount QINJ, and a control input corresponding to the target vane opening VANE_CMD is supplied to the vane actuator 7d, whereby the boost pressure is controlled.

Furthermore, in the swirl control process, a target swirl opening SW_CMD of the swirl valve 9a is calculated by searching a map (not shown) for lean control according to the fuel injection amount QINJ, and a control input corresponding to the target swirl opening SW_CMD is supplied to the swirl actuator 9b, whereby the swirl is controlled.

Further, in the EGR control process, a target fresh air amount M_CMD is calculated by searching a map (not shown) for lean control according to the fuel injection amount QINJ, and the EGR control valve 10b is controlled with a predetermined feedback control algorithm such that the fresh air amount M_ACT converges to the target fresh air amount M_CMD. In the step 44, the lean control is executed as described above, followed by terminating the present process.

On the other hand, if the answer to the question of the step 40 is affirmative (YES), i.e. the conditions for executing the reduction control are satisfied, the process proceeds to a step 45, wherein the demanded torque PMCMD is calculated by searching a map (not shown) for reduction control according to the engine speed NE and the accelerator pedal opening AP. In this map for reduction control, the demanded torque PMCMD is set to a larger value as the engine speed NE is higher or as the accelerator pedal opening AP is larger.

Then, in a step 46, the fuel injection amount QINJ is calculated by searching a map (not shown) for reduction control according to the engine speed NE and the demanded torque PMCMD. In this map for reduction control, the fuel injection amount QINJ is set to a larger value as the engine speed NE is higher or as the demanded torque PMCMD is larger.

In a step 47 following the step 46, the fuel injection termination timing φINJ is calculated by searching a map (not shown) for reduction control according to the engine speed NE and the fuel injection amount QINJ, whereby according to the fuel injection amount QINJ and the fuel injection termination timing φINJ, calculated as above, fuel is injected sequentially from the fuel injection valves 4 into the respective cylinders 3a associated therewith.

Next, the process proceeds to a step 48, wherein the reduction control process is carried out so as to reduce NOx trapped in the NOx cleaning catalyst 12, as described hereinafter, followed by terminating the present process.

Figure 6:
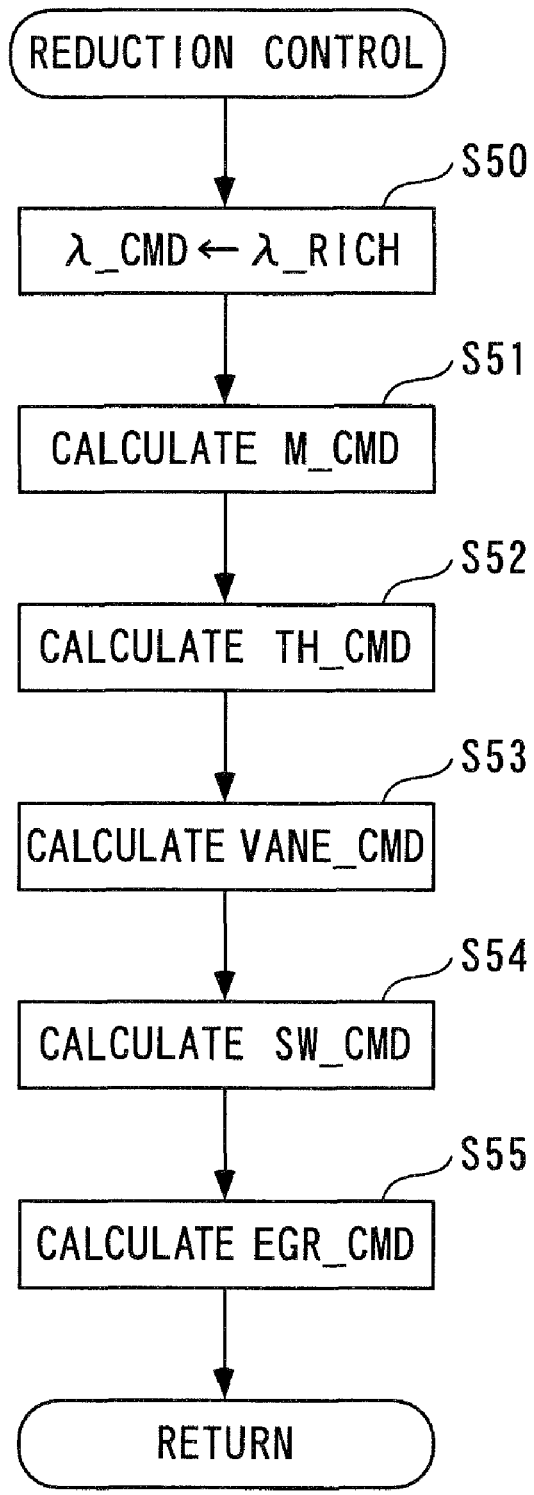
FIG. 6 is a flowchart showing a reduction control process.

Next, the above-described reduction control process will be described with reference to FIG. 6. As shown in FIG. 6, in this process, first, in a step 50, a target excess air ratio λ_CMD is set to the predetermined reduction control value λ_RICH (e.g. 0.965).

Next, the process proceeds to a step 51, wherein the target fresh air amount M_CMD is calculated. More specifically, the target fresh air amount M_CMD is calculate by multiplying the fuel injection amount QINJ by the target excess air ratio λ_CMD and 14.7.

Then, the process proceeds to a step 52, wherein the target throttle valve opening TH_CMD is calculated by searching a map (not shown) for reduction control according to the target fresh air amount M_CMD and the engine speed NE, and a control input corresponding to the target throttle valve opening TH_CMD is supplied to the TH actuator 8b, whereby the throttle valve 8a is controlled to a state in which the degree of opening thereof is more narrowed than in the wide-open state.

In a step 53 following the step 52, the target vane opening VANE_CMD of the variable vanes 7c is calculated by searching a map (not shown) for reduction control according to the target fresh air amount M_CMD and the engine speed NE, and a control input corresponding to the target vane opening VANE_CMD is supplied to the vane actuator 7d, whereby boost pressure is controlled.

Next, in a step 54, the target swirl opening SW_CMD of the swirl valve 9a is calculated by searching a map (not shown) for reduction control according to the target fresh air amount M_CMD and the engine speed NE, and a control input corresponding to the target swirl opening SW_CMD is supplied to the swirl actuator 9b, whereby swirl is controlled.

Then, the process proceeds to a step 55, wherein a target EGR amount EGR_CMD is calculated, as described hereinafter. First, a basic value EGR_FF is calculated by searching a map (not shown) according to the target fresh air amount M_CMD and the engine speed NE. Then, a correction value EGR_FB is calculated with a predetermined feedback control algorithm such that the difference between the first excess air ratio $\lambda 1$ and the target excess air ratio $\lambda$_CMD becomes equal to 0. Then, the target EGR amount EGR_CMD is calculated by adding together the basic value EGR_FF and the correction value EGR_FB, followed by terminating the present process.

After the target EGR amount EGR_CMD is calculated in the step 55 as described above, the fresh air amount M_ACT is feedback-controlled such that it converges to the target fresh air amount M_CMD, whereby the first excess air ratio $\lambda 1$ is controlled such that it converges to the target excess air ratio $\lambda$_CMD. As a result, exhaust gases under a reducing atmosphere, containing unburned fuel as a reducing agent, are supplied to the NOx cleaning catalyst 12, whereby the trapped NOx is reduced and cleaned in the NOx cleaning catalyst 12.

As described hereinabove, according to the exhaust emission control device 1 of the present embodiment, when S_QNOx≧SREF holds, the reducing condition flag F_RICH is set to 1, and the lambda determination flag F_$\lambda$CHECK is set to 1 when TEX>TREF holds whereas it is set to 0 when TEX≦TREF holds (steps 4 and 7 to 10). Further, when F_RICH=1 holds, the reduction control is executed (steps 40 and 48). During the reduction control, if F_$\lambda$CHECK=1 holds, it is determined that the reduction control should be terminated when the second excess air ratio $\lambda 2$ has become smaller than the predetermined value $\lambda$REF, i.e. when the second excess air ratio $\lambda 2$ has become a richer value than the predetermined value $\lambda$REF (steps 24 and 26).

As described hereinbefore, the ceria-zirconia composite oxide as the auxiliary catalyst has a high oxygen storage capacity when TEX>TREF holds, so that it is possible to ensure high reliability of the detection by the second LAF sensor 24, thereby making it possible to also ensure high reliability of the determination of termination of the reduction control based on the second excess air ratio $\lambda 2$. As a consequence, when TEX>TREF holds, it is possible to terminate the reduction control in proper timing.

On the other hand, if F_$\lambda$CHECK=0 holds, i.e. if TEX≦TREF holds, indicating that the ceria-zirconia composite oxide has only a fairly low oxygen storage capacity, and hence the detection by the second LAF sensor 24 is low in reliability, it is determined that the reduction control should be terminated when the remaining NOx amount R_QNOx is not larger than the predetermined value RREF (steps 26 and 30). The remaining NOx amount R_QNOx is calculated using the reduced NOx amount DNOx, and the reduced NOx amount DNOx is calculated according to three values (the fresh air amount M_ACT, the engine speed NE, and the fuel injection amount QINJ) indicative of the supply amount of the reducing agent. The supply amount of the reducing agent properly indicates an actually reduced amount of NOx trapped in the NOx cleaning catalyst 12, and therefore the reduced NOx amount DNOx can be calculated such that it accurately represents the amount of NOx actually reduced in the NOx cleaning catalyst 12. As a consequence, the remaining NOx amount R_QNOx can be accurately calculated, whereby it is also possible to ensure high reliability of the determination of termination of the reduction control based on the remaining NOx amount R_QNOx, whereby even when TEX≦TREF holds, it is possible to terminate the reduction control in proper timing.

As described heretofore, it is possible to properly determine timing for terminating the reduction control, irrespective of whether or not the exhaust air temperature TEX is higher than the predetermined value TREF. As a consequence, it is possible to execute the reduction control for a just enough time period to thereby reduce exhaust emissions and improve fuel economy.

Although in the above-described embodiment, the catalyst comprised of an alumina carrier, platinum and barium supported on there alumina carrier as the primary catalysts, and a ceria-zirconia composite oxide supported on the alumina carrier as the auxiliary catalyst is used as the NOx cleaning catalyst 12, by way of example, the NOx cleaning catalyst for use in the present invention is not limited to this, but any suitable NOx cleaning catalyst may be used insofar as it includes an auxiliary catalyst having an oxygen storage capacity, traps NOx contained in exhaust gases under an oxidizing atmosphere, and reduces the trapped NOx by the supply of exhaust gases under a reducing atmosphere which contain a reducing agent. For example, as the primary catalysts, there may be used any of platinum group elements (e.g. rhodium, palladium and iridium), and any of alkaline earth metals (e.g. calcium), alkaline metals (e.g. potassium and sodium), and rare earths (e.g. yttrium). Further, a ceria oxide or the like may be used as the auxiliary catalyst.

Further, although in the above-described embodiment, the exhaust air temperature sensor 23 for detecting the exhaust air temperature TEX is used as the oxygen storage capacity parameter-detecting means for detecting the oxygen storage capacity parameter, by way of example, the oxygen storage capacity parameter-detecting means of the present invention is not limited to this, but any suitable oxygen storage capacity parameter-detecting means may be used insofar as it is capable of detecting the oxygen storage capacity parameter indicative of the oxygen storage capacity of the auxiliary catalyst of the NOx cleaning catalyst. For example, a plurality of operating condition parameters (the engine speed NE, the accelerator pedal opening AP, etc.) indicative of the operating conditions of the engine 3 may be detected by various sensors, and the oxygen storage capacity parameter indicative of the oxygen storage capacity of the auxiliary catalyst may be estimated based on these operating condition parameters.

Furthermore, although in the above-described embodiment, the exhaust air temperature TEX is used as the temperature parameter indicative of the temperature of the NOx cleaning catalyst, by way of example, the temperature parameter for use in the present invention is not limited to this, but any suitable temperature parameter may be used insofar as it indicates the temperature of the NOx cleaning catalyst. For example, the temperature of the NOx cleaning catalyst 12 itself may be directly detected as a temperature parameter using a temperature parameter-detecting means, such as a temperature sensor.

Further, although in the above-described embodiment, the second LAF sensor 24 is used as the air-fuel ratio parameter-detecting means, by way of example, the air-fuel ratio parameter-detecting means of the present invention is not limited to this, but any suitable air-fuel ratio parameter-detecting means may be used insofar as it is capable of detecting an air-fuel ratio parameter indicative of an air-fuel ratio of exhaust gases flowing through a portion of the exhaust passage downstream of the NOx cleaning catalyst 12. For example, a titania-type oxygen concentration sensor may be used as the air-fuel ratio parameter-detecting means.

Furthermore, although in the above-described embodiment, the excess air ratio $\lambda$ is used as the air-fuel ratio parameter, the air-fuel ratio parameter for use in the present invention is not limited to this, but any suitable air-fuel ratio parameter may be used insofar as it indicates an air-fuel ratio of exhaust gases. For example, an air-fuel ratio itself in exhaust gases, or the concentration of oxygen in exhaust gases may be used as the air-fuel ratio parameter.

On the other hand, although in the above-described embodiment, the air-fuel ratio control is executed as the reduction control such that the first excess air ratio $\lambda 1$ becomes equal to the value $\lambda\_RICH$ on the rich side, the reduction control of the present invention is not limited to this, but any suitable reduction control may be executed insofar as it is capable of controlling exhaust gases flowing into the NOx cleaning catalyst 12 such that the exhaust gases form a reducing atmosphere. For example, by providing a fuel injection valve for supplying a reducing agent in the exhaust passage 11 and causing fuel to be directly injected from the fuel injection valve into the exhaust passage 11, exhaust gases flowing into the NOx cleaning catalyst 12 may be controlled to form a reducing atmosphere.

Further, although in the above-described embodiment, the exhaust emission control device 1 according to the present invention is applied to a diesel engine, by way of example, this is not limitative, but it may be applied not only to the diesel engine according to the above-described embodiment but also to any suitable internal combustion engines. For example, the exhaust emission control device according to the present invention may be applied to a gasoline engine. In addition, the exhaust emission control device according to the present invention may be applied not only to the diesel engine installed on a vehicle as described in the embodiment, but also to various types of internal combustion engines including ship propulsion engines.

It is further understood by those skilled in the art that the foregoing are preferred embodiments of the invention, and that various changes and modifications may be made without departing from the spirit and scope thereof.

What is claimed is:

1. An exhaust emission control device for an internal combustion engine, comprising:

a NOx cleaning catalyst disposed in an exhaust passage of the engine, said NOx cleaning catalyst including an auxiliary catalyst having an oxygen storage capacity, and operating to trap NOx contained in exhaust gases under an oxidizing atmosphere, and reduce the trapped NOx by being supplied with exhaust gases under a reducing atmosphere including a reducing agent, to thereby clean the NOx;

temperature parameter-detecting means for detecting a temperature parameter indicative of a temperature of said NOx cleaning catalyst, as an oxygen storage capacity parameter indicative of the oxygen storage capacity of said auxiliary catalyst of said NOx cleaning catalyst;

air-fuel ratio parameter-detecting means for detecting an air-fuel ratio parameter indicative of an air-fuel ratio of exhaust gases flowing through a portion of the exhaust passage downstream of said NOx cleaning catalyst;

trapped NOx amount-calculating means for calculating an amount of NOx trapped in said NOx cleaning catalyst, as a trapped NOx amount; and reduction control means for executing reduction control in which exhaust gases flowing into said NOx cleaning catalyst are controlled to the reducing atmosphere, by supplying the reducing agent to an upstream side of said NOx cleaning catalyst, so as to cause said NOx cleaning catalyst to perform a NOx reducing operation, when the calculated trapped NOx amount becomes not smaller than a predetermined value, wherein said reduction control means comprises:

remaining NOx amount-calculating means for calculating a remaining amount of NOx trapped in said NOx cleaning catalyst as a remaining NOx amount, during execution of the reduction control, based on a supply amount parameter indicative of a supply amount of the reducing agent;

first determination means for determining that the reduction control should be terminated, when the air-fuel ratio in the exhaust gases, indicated by the detected air-fuel ratio parameter, has been shifted to a richer value than a predetermined value during execution of the reduction control; and inhibiting means for inhibiting said first determination means from determining termination of the reduction control during execution of the reduction control, when the temperature of said NOx cleaning catalyst, indicated by the detected temperature parameter, is not within a predetermined temperature range, and second determination means for determining that the reduction control should be terminated during execution of the reduction control, when said first determination means is inhibited from determining termination of the reduction control by said inhibiting means, if the remaining NOx amount is not larger than a predetermined value.

* * * * *